(12) United States Patent
Nowak-Przygodzki et al.

(10) Patent No.: US 9,547,690 B2
(45) Date of Patent: Jan. 17, 2017

(54) QUERY REWRITING USING SESSION INFORMATION

(71) Applicant: Google Inc., Mountain View, CA (US)

(72) Inventors: Marcin M. Nowak-Przygodzki, Zurich (CH); Behshad Behzadi, Zurich (CH)

(73) Assignee: Google Inc., Mountain View, CA (US)

( * ) Notice: Subject to any disclaimer, the term of this patent is extended or adjusted under 35 U.S.C. 154(b) by 268 days.

(21) Appl. No.: 14/486,879

(22) Filed: Sep. 15, 2014

(65) Prior Publication Data

US 2016/0078086 A1 Mar. 17, 2016

(51) Int. Cl.
*G06F 17/30* (2006.01)

(52) U.S. Cl.
CPC ..... *G06F 17/30448* (2013.01); *G06F 17/3053* (2013.01); *G06F 17/30112* (2013.01); *G06F 17/30424* (2013.01); *G06F 17/30646* (2013.01); *G06F 17/30867* (2013.01)

(58) Field of Classification Search
CPC ................ G06F 17/30; G06F 17/30112; G06F 17/30424; G06F 17/3053
USPC .................................................. 707/600–899
See application file for complete search history.

(56) References Cited

U.S. PATENT DOCUMENTS

| | | | |
|---|---|---|---|
| 7,552,112 B2 | 6/2009 | Jhala et al. | |
| 7,840,538 B2 | 11/2010 | Joshi et al. | |
| 8,442,987 B2 | 5/2013 | Leggetter et al. | |
| 8,688,667 B1 | 4/2014 | Kurzion et al. | |
| 2005/0222977 A1 | 10/2005 | Zhou et al. | |
| 2006/0064411 A1 | 3/2006 | Gross et al. | |
| 2007/0168854 A1 | 7/2007 | de Marcken et al. | |
| 2009/0043749 A1 | 2/2009 | Garg et al. | |
| 2012/0136884 A1* | 5/2012 | Kanawa .............. | G06F 17/3092 707/760 |
| 2012/0254217 A1 | 10/2012 | Ali et al. | |
| 2012/0290575 A1 | 11/2012 | Hu et al. | |
| 2014/0143268 A1 | 5/2014 | Finkelstein et al. | |

OTHER PUBLICATIONS

Jones et al., "Generating query substitutions," Proceedings of the 15th International Conference on World Wide Web, May 23-25, 2006, ACM, pp. 387-396.
International Search report and Written Opinion in International Application No. PCT/US2015/049212, mailed Dec. 8, 2015, 13 pages.
U.S. Appl. No. 14/448,547, filed Jul. 31, 2014, Retrieving Context from Previous Sessions, Joshi.

* cited by examiner

*Primary Examiner* — Isaac M Woo
(74) *Attorney, Agent, or Firm* — Fish & Richardson P.C.

(57) ABSTRACT

Methods, systems, and apparatus, including computer programs encoded on computer storage media, for natural language processing. One of the methods includes receiving a search query from a user during a user session; obtaining a plurality of prior search queries by the user received during the user session; generating a plurality of candidate query rewrites, wherein the candidate query rewrites are derived from the search query and the plurality of prior search queries by the user; scoring each candidate query rewrite, wherein scoring each candidate rewrite includes determining a quality of each candidate query rewrite based on an analysis of search results responsive to the candidate query rewrite; selecting a candidate query rewrite having a score that satisfies a threshold value; and providing search results responsive to the selected candidate query rewrite.

20 Claims, 3 Drawing Sheets

QUERY REWRITING USING SESSION INFORMATION

BACKGROUND

This specification relates to natural language processing.

The Internet provides access to a wide variety of resources, such as image files, audio files, video files, and web pages. A search system can identify resources in response to queries submitted by users and provide information about the resources in a manner that is useful to the users. The users can navigate through, e.g., select, search results to obtain information of interest.

SUMMARY

In general, one innovative aspect of the subject matter described in this specification can be embodied in methods that include the actions of receiving a search query from a user during a user session; obtaining a plurality of prior search queries by the user received during the user session; generating a plurality of candidate query rewrites, wherein the candidate query rewrites are derived from the search query and the plurality of prior search queries by the user; scoring each candidate query rewrite, wherein scoring each candidate rewrite includes determining a quality of each candidate query rewrite based on an analysis of search results responsive to the candidate query rewrite; selecting a candidate query rewrite having a score that satisfies a threshold value; and providing search results responsive to the selected candidate query rewrite. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. Generating the plurality of candidate query rewrites further includes concatenating the search query with each prior search query of the plurality of search queries. Each prior search query includes a timestamp, and wherein scoring the candidate query rewrites includes weighting candidate rewrites based, in part, on the age of the corresponding prior query. Generating the plurality of candidate query rewrites further includes identifying queries from a collection of queries from a plurality of users that are similar to the search query. Scoring each candidate query rewrite further includes determining a measure of popularity for each candidate query rewrite based on a collection of queries from a plurality of users. Scoring each candidate query rewrite further includes determining whether the search query includes a referential term of a particular type. A score of a candidate query rewrite is increased in response to determining that the candidate query rewrite includes an entity of the particular type. Scoring each candidate query rewrite further includes determining whether the search query includes terms highly correlated with particular entities. A score of a candidate query rewrite is increased in response to determining that the candidate query rewrite includes the entity highly correlated with the query term. Determining a quality of each candidate query rewrite based on an analysis of search results responsive to the candidate query rewrite includes obtaining search results responsive to each candidate query rewrite and determining a quality of the search results.

The subject matter described in this specification can be implemented in particular embodiments so as to realize one or more of the following advantages. Using prior user session queries to rewrite queries improves the likelihood of returning search results responsive to the user's intent.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Query rewriting is used to improve the likelihood of returning search results that are most relevant to the user's intended query. Search queries previously entered in a particular search session can be used in query rewriting of a current search query of the search session. For example, a user can submit a current query that is related to a one of the previously entered search queries of the session. A search system can determine which prior search query is related to the current query and use the prior query in query rewriting. The rewritten query can then be used by a search system to determine one or more search results to provide to the user.

Figure 1:
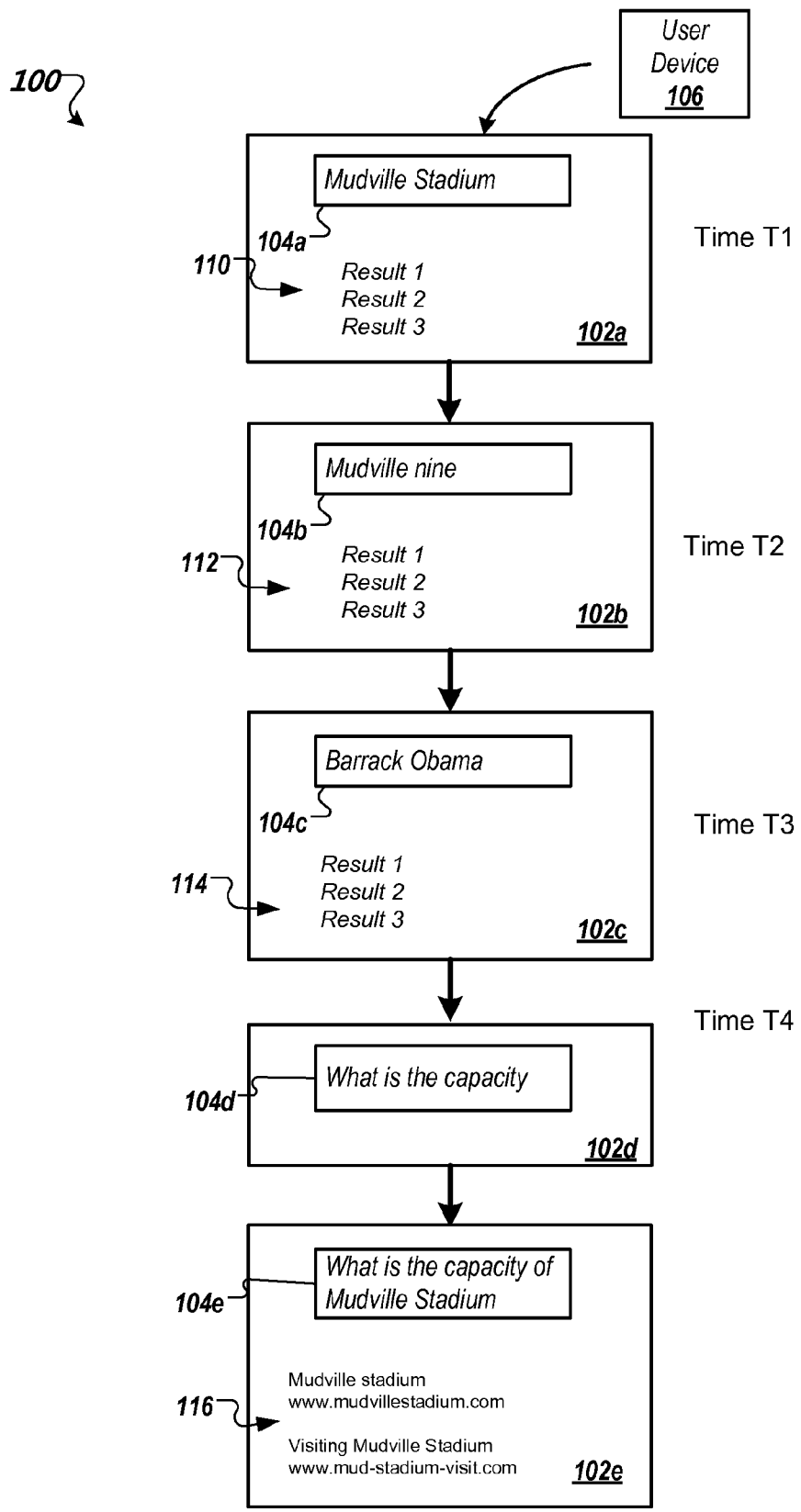
FIG. 1 is an illustration of a search session in an example search user interface.

FIG. 1 is an illustration of a search session in an example search user interface. A search system provides a search user interface 102*a* for displaying on a user device 106. The user interface 102*a* includes a search box 104*a* for receiving a query. The query can be a text query input by a user of the user device or a voice query entered using a microphone of the user device.

In the user session, the search system receives a first query from the user device 106 at time T1. In particular, the user provides the search query [Mudville Stadium]. Upon initiating the search, the search system identifies search results for resources responsive to the first query. The search system provides search results 110 responsive to the query [Mudville Stadium] for display in the user interface 102*a*. For example, the search results 110 can include links to particular resources determined by the search system to be responsive to the first query.

At a time T2 in the user session, the search system receives a second query from the user device 106 in the search box 104*b* of the user interface 102*b*. In particular, the user provides the search query [Mudville nine]. Upon initiating the search, the search system identifies search results for resources responsive to the second query and provides search results 112 for display in the user interface 102*b*.

At a time T3 in the user session, the search system receives a third query from the user device 106 in the search box 104c of the user interface 102c. In particular, the user provides the search query [Barack Obama]. Upon initiating the search, the search system identifies search results for resources responsive to the second query and provides search results 114 for display in the user interface 102c.

At a time T4 in the user session, the search system receives a fourth query from the user device 106 in the search box 104d of the user interface 102d. In particular, the user provides the search query [what is the capacity]. The search system determines that the fourth query is related to an early query in the user session. In particular, the search system determines that the query [what is the capacity] is related to the first query [Mudville Stadium]. Techniques for determining that a currently received query is related to an earlier query in the user session are described below.

In response to determining that the fourth query is related to the first query in the user session, the search system rewrites the fourth query as [what is the capacity of Mudville Stadium]. Upon initiating the search using the rewritten query, which can be displayed in search box 104e, the search system identifies search results for resources responsive to the rewritten query and provides search results 116 for display in the user interface 102e.

Figure 2:
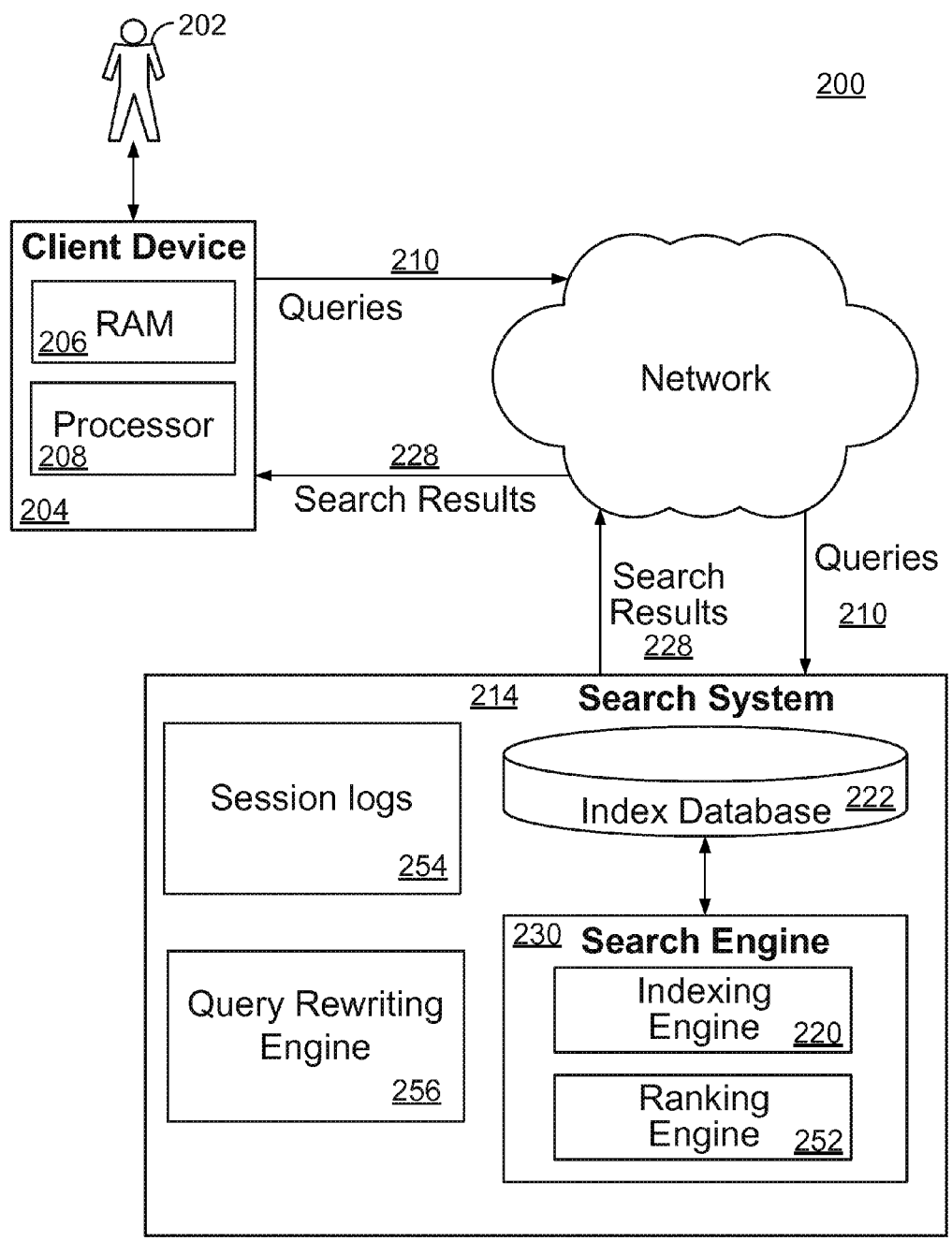
FIG. 2 is a block diagram of an example system.

FIG. 2 is a block diagram of an example system 200. The system 200 provides search results relevant to submitted queries as can be implemented in an internet, an intranet, or another client and server environment. The system 200 is an example of an information retrieval system in which the systems, components, and techniques described below can be implemented.

A user 202 can interact with a search system 214 through a client device 204. For example, the client 204 can be a computer coupled to the search system 214 through a local area network (LAN) or wide area network (WAN), e.g., the Internet. In some implementations, the search system 214 and the client device 204 can be one machine. For example, a user can install a desktop search application on the client device 204. The client device 204 will generally include a random access memory (RAM) 206 and a processor 208.

The user 202 can submit queries 210 to a search engine 230 within a search system 214. When the user 202 submits a query 210, the query 210 is transmitted through a network to the search system 214. The search system 214 can be implemented as, for example, computer programs running on one or more computers in one or more locations that are coupled to each other through a network.

The search system 214 further includes an index database 222 and a search engine 230. The search system 214 responds to an input query by generating search results 228, which are transmitted through the network to the client device 204 in a form that can be presented to the user 202 (e.g., as a search results web page to be displayed in a web browser running on the client device 204).

When the query is received by the search engine 230, the search engine 230 identifies resources that match, or are responsive to, the query 210. The search engine 230 will generally include an indexing engine 220 that indexes resources (e.g., web pages, images, or news articles on the Internet) found in a corpus (e.g., a collection or repository of content), an index database 222 that stores the index information, and a ranking engine 252 (or other software) to rank the resources that match the query 210. The indexing and ranking of the resources can be performed using conventional techniques. The search engine 130 can transmit the search results 228 through the network to the client device 204 for presentation to the user 202.

The search system 230 also includes session logs 254. The session logs 254 maintain logs of queries submitted during user sessions including user sessions of user 202. A session can be defined in a number of different ways. For example, a session can include queries submitted within a specified time range from an initial query, e.g., all queries submitted within one hour of a first query. The session can also include queries submitted during a particular browser session, e.g., queries submitted while the browser application is running on the client device 204. The session can be associated with a particular user identifier or with a device identifier.

The search system 230 also includes a query rewriting engine 256. The query rewriting engine 256 can rewrite received queries based on various criteria. In particular, as described in this specification, the query rewriting engine 256 can use the log of the queries submitted during a user session to determine whether a received query 210 should be rewritten based on a related query in the session logs 254.

Figure 3:
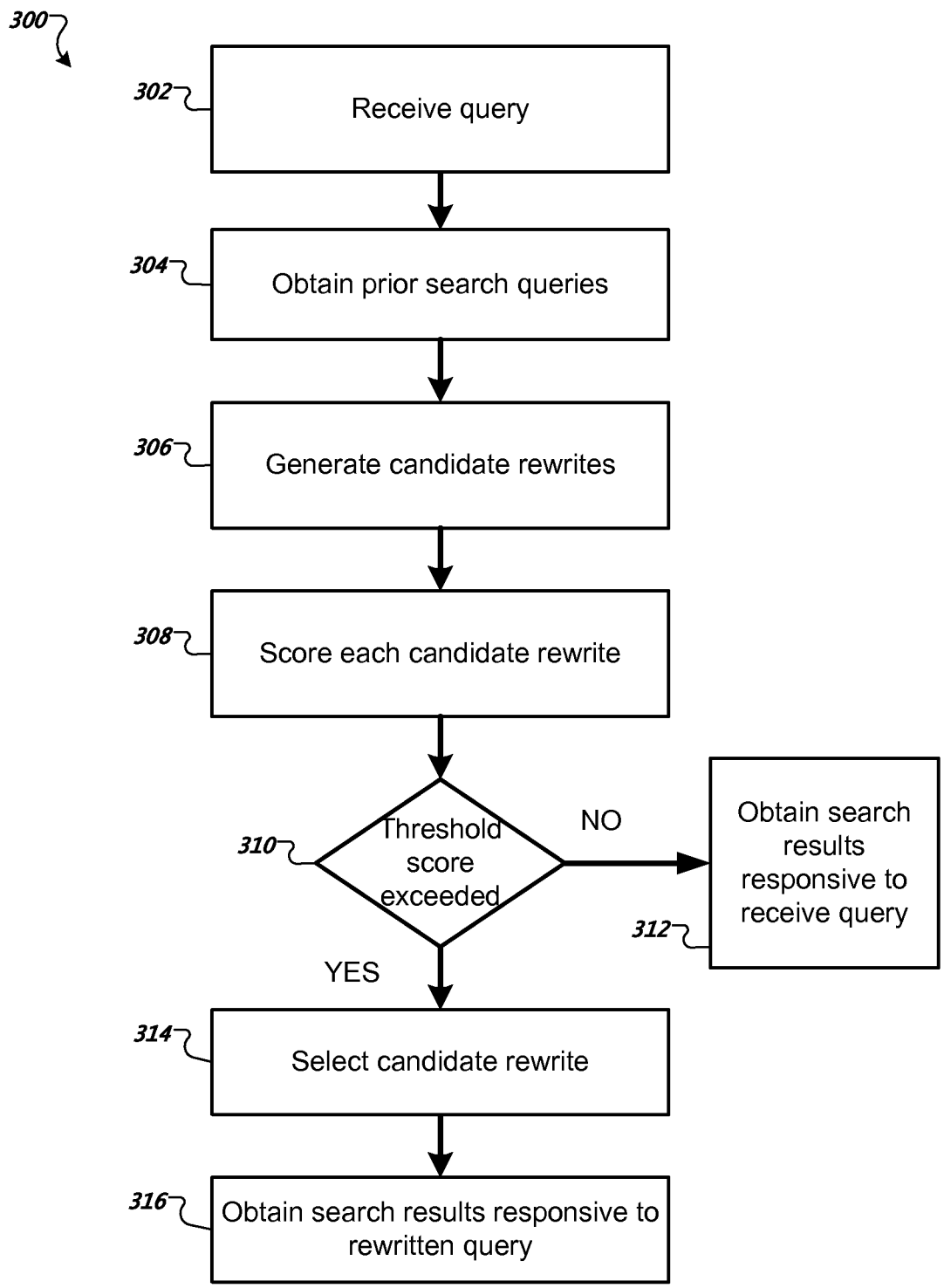
FIG. 3 is a flow diagram of an example process for query rewriting.

FIG. 3 is a flow diagram of an example process 300 for query rewriting. For convenience, the process 300 will be described as being performed by a system of one or more computers, located in one or more locations, and programmed appropriately in accordance with this specification. For example, a search system, e.g., the search system 214 of FIG. 2, appropriately programmed, can perform the process 300.

The system receives a search query (302). A user can input the search query to a search user interface. For example, a user can access the search user interface using a search application or a browser application directed to a search interface. The search query can be part of a user search session including multiple prior search queries. The received search query may implicitly reference a prior query of the user session. For example, the received query, q: [what is the capacity] can refer to an earlier query about a building or facility. Similarly, the received query, q: [when is the next game] can refer to an earlier query about a particular sports team.

The system obtains prior search queries input during the user session (304). The prior search queries can be obtained, for example, from a query log that identifies queries as belonging to one or more particular sessions. For example, the obtained prior queries can be:

q1: [Mudville Stadium]
q2: [Mudville nine]
q3: [Barack Obama]

In some implementations, the system determines whether threshold criteria are satisfied prior to obtaining prior search queries. For example, the system can apply one or more triggering rules. The rules can include, for example, determining whether the received query includes one or more terms that indicate contextual intent, e.g., use of pronoun or other referential term in the query, or whether the received query was a repeated query.

Each prior search query of the user session also has an associated timestamp corresponding to the time when the search query was received. Therefore, each prior search query can be represented by tuples of the form (query, timestamp) such that the prior search queries can be represented as $(q_1, t_1), \ldots (q_n, t_n)$ were n is equal to the number of prior search queries.

The system generates candidate rewrites for the received search query (306). In some implementations, candidate rewrites are generated through combining each respective prior search query with the received search query. In some other implementations, natural language information can be used to generate candidate rewrites. Furthermore, search queries that are similar to one or more of the prior search queries and the search query can be used to generate candidate rewrites.

Candidate rewrites can be generated according to a function that combines the prior search queries and the received search query and to output candidate rewrites. In particular, a collection of tuples (query, timestamp) can be represented as a set of prior search queries $Q=\{(q_1, t_1), \ldots, (q_n, t_n)\}$. For example, for each element in Q and the received search query q, the function can be defined as: $C((q_i, t_i), q) \rightarrow \{(q_i, t_i), q, r_1), \ldots, ((q_i, t_i), q, r_{\{Nqi\}})\}$ that takes the input pair (query, timestamp) and received search query q, and generates $Nq_i$ rewrites, r, where $Nq_i$ is a integer.

One example of the function is a concatenation of each prior search query with the received search query, which generates $Nq_i$ rewrites where each is a combination of the received search query and one of the previous search queries. For example, in the above example search queries and the received search query [what is the capacity], the candidate rewrites under a concatenation function would be:

r1: [Mudville stadium what is the capacity],
r2: [Mudville nine what is the capacity], and
r3: [Barack Obama what is the capacity].

In some implementations, additional information can be used to expand the generated candidate rewrites. For example, search query similarity can be used to generate grammars including search queries that are similar to the prior search queries and the received search query. Thus, for all queries that have a specified degree of similarity, e.g., using a suitable similarity measure, to the prior search queries $q_i$ and the received search query q, the concatenation of all new pairs is the output set $Q=\{C((q_1, t_1), q)+C((q_2, t_2), q) \ldots \}$.

In some implementations, the system identifies similar search queries based on similar search queries that are input by a collection of users to a search system, e.g., based on search query logs. For example, if users input a similar search query [Mudville stadium capacity] a threshold number of times in the search query log, i.e., the search query is sufficiently popular, the logged search query can be used as a candidate rewrite.

In some implementations, similar search queries are identified based on queries that use the same terms with our without stop-words, e.g., a, the, or that use similar types of terms in the queries. For example, the query [Mudville stadium what is the capacity] can be similar to the query [what is the capacity of Mudville stadium] and [Mudville stadium capacity] based on the use of common query terms. In some other implementations, particular query patterns can be used to identify similar queries. For example, query logs can indicate that [x capacity] is a common query pattern where X is a stadium/building/etc. Thus, if a current query is [capacity] and one of the previous queries identified an entity associated with a stadium, then candidates can be generated using the pattern.

In some other implementations, the system can use natural language information to generate similar search queries. For example, the use of a pronoun in the current search query can indicate that the pronoun can be replaced by a particular entity. Entities can be identified in the prior search queries and substituted into the current search query as candidate rewrites. For example, if the current received search query is [how old is he], the pronoun "he" indicates that the object is a person entity. If one of the prior search queries is [Barack Obama], the entity can be substituted to generate candidate rewrite [how old is Barack Obama]. Similarly, if the current received search query is [where is it] natural language analysis suggests that the "it" refers to a place or thing entity. Thus, if one of the prior search queries is [Golden Gate Bridge year built], the entity can be substituted to generate the candidate rewrite [where is Golden Gate Bridge].

The system scores each candidate rewrite (308). The system scores candidate rewrites according to one or more criteria. The one or more criteria can include: (i) the timestamp of the prior search queries associated with the respective candidate rewrites, (ii) a quality measure based on query results of the candidate rewrite, (iii) a popularity of the query rewrite, (iv) a use of referential terms, and (v) entities that commonly appear with particular query terms. Based on the one or more criteria, a scoring function S can be defined such that for a candidate set Q a scoring function $S((q_i, t_i), q, r) \rightarrow R$ assigns a score of the candidate rewrite given the inputs $(q_i, t_i)$ and q.

As described above, each prior search query of the user session includes a timestamp indicating the time at which the prior search query was received. The timestamp can be used in scoring candidate rewrites. In particular, the system can provide a penalty weight in the scoring based on the age of the prior search query or similarly a boost for younger prior queries. Thus, the older the prior search query is, the less likely it is that a received search query refers to that prior search query. For example, a search query [Barack Obama] can be received at time T1 and a search query [Bill Clinton] can be received a later time T3. For a received search query at a time T5, [how old is he], the candidate rewrite [how old is Barack Obama] can be weighted adversely relative to the candidate rewrite [how old is Bill Clinton].

The quality measure can be used as a factor in the score for each candidate rewrite. The quality measure is based on search query results of the candidate rewrite. In particular, candidate rewrites can be submitted to a search engine. The results of each candidate rewrite can be analyzed to determine the quality measure. The analysis can include one or more of determining a number of returned search results, a determination of how often search results are selected by users, or a quality score associated with particular search results. Candidate rewrites that have a greater quality measure can be weighted more greatly given to the quality measure factor in scoring the candidate rewrite.

A popularity of the query rewrite can be used as a factor in the score for each candidate rewrite. The popularity of the query rewrite is a measure of how many times the candidate rewrite occurs in a collection of search queries. For example, examining a search query log for a collection of users, the relative frequency of occurrence for each candidate rewrite can be determined. Candidate rewrites that occur with a higher frequency can have a weighted more greatly given to the popularity factor in the scoring of the candidate rewrite.

The use of referential terms can be used as a factor in the score for each candidate rewrite. In particular, the current search query can have a clear referential term, e.g., a third person pronoun or other referential terms such as "it" or "there", and a prior search query in the session has a respective entity of a particular type, e.g., a person, a location. Candidate rewrites that combine the referential term with the corresponding entities of the particular referred type can be weighted more greatly in the scoring of the candidate rewrite.

The identification of entities that commonly appear with particular search query terms can be used as a factor in the score for each candidate rewrite. In particular, particular terms can be highly correlated to particular entities in search queries. For example, the term "capacity" can be highly correlated to a entities of the type "sports facilities," the term "lyrics" can be highly correlated to entities of the type "song," and the term "date of birth" can be highly correlated to entities of the type "people." The received search query can include a term that is correlated in search queries, e.g., in a query log, that include a particular entity type. If an entity of the particular entity type also occurs in the prior user search queries of the user session, candidate rewrites generated with those entities can be weighted more greatly in the scoring of the candidate rewrite.

The system determines whether a threshold score is satisfied (310). In some implementations, the highest scoring candidate rewrite is determined and compared to a threshold score. In response to determining that the highest scoring candidate rewrite does not satisfy the threshold score, 'no' branch of 310, the system obtains search results responsive to the received query without rewriting based on prior search queries of the user session (312). The search results can be provided to the user device for presentation in a user search interface.

In response to determining that the highest scoring candidate rewrite does satisfy the threshold score, 'yes' branch of 310, the system selects the candidate rewrite (314) to rewrite the received search query and obtains search results responsive to the rewritten search query. The search results can be provided to the user device for presentation in a user search interface.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

In this specification the term "engine" will be used broadly to refer to a software based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a search query from a user during a user session;
   obtaining a plurality of prior search queries by the user received during the user session;
   generating a plurality of candidate query rewrites, wherein the candidate query rewrites are derived from the search query and the plurality of prior search queries by the user;
   scoring each candidate query rewrite, wherein scoring each candidate rewrite includes applying a plurality of scoring factors including a quality measure for each candidate query rewrite, and wherein the quality measure is based on an analysis of search results responsive to the candidate query rewrite;
   selecting a top scoring candidate query rewrite in response to determining that the score satisfies a threshold value; and
   providing search results responsive to the selected candidate query rewrite.

2. The method of claim 1, wherein generating the plurality of candidate query rewrites further comprises concatenating the search query with each prior search query of the plurality of search queries.

3. The method of claim 2, wherein each prior search query includes a timestamp, and wherein scoring the candidate query rewrites includes weighting candidate rewrites based, in part, on the age of the corresponding prior query.

4. The method of claim 1, wherein generating the plurality of candidate query rewrites further comprises identifying queries from a collection of queries from a plurality of users that are similar to the search query.

5. The method of claim 1, wherein applying the plurality of scoring factors for each candidate query rewrite further comprises determining a measure of popularity for each candidate query rewrite based on a collection of queries from a plurality of users.

6. The method of claim 1, wherein applying the plurality of scoring factors for each candidate query rewrite further comprises determining whether the search query includes a referential term of a particular type.

7. The method of claim 6, wherein a score of a candidate query rewrite is increased in response to determining that the candidate query rewrite includes an entity of the particular type.

8. The method of claim 1, wherein applying the plurality of scoring factors for each candidate query rewrite further comprises determining whether the search query includes terms highly correlated with particular entities.

9. The method of claim 8, wherein a score of a candidate query rewrite is increased in response to determining that the candidate query rewrite includes the entity highly correlated with the query term.

10. The method of claim 1, wherein determining a quality of each candidate query rewrite based on an analysis of search results responsive to the candidate query rewrite includes obtaining search results responsive to each candidate query rewrite and determining a quality of the search results.

11. A system comprising:
a user device; and
one or more computers configured to interact with the user device and to perform operations comprising:
receiving a search query from a user of the user device during a user session;
obtaining a plurality of prior search queries by the user received during the user session;
generating a plurality of candidate query rewrites, wherein the candidate query rewrites are derived from the search query and the plurality of prior search queries by the user;
scoring each candidate query rewrite, wherein scoring each candidate rewrite includes applying a plurality of scoring factors including a quality measure for each candidate query rewrite, and wherein the quality measure is based on an analysis of search results responsive to the candidate query rewrite;
selecting a top scoring candidate query rewrite in response to determining that the score satisfies a threshold value; and
providing search results responsive to the selected candidate query rewrite to the user device.

12. The system of claim 11, wherein generating the plurality of candidate query rewrites further comprises concatenating the search query with each prior search query of the plurality of search queries.

13. The system of claim 12, wherein each prior search query includes a timestamp, and wherein scoring the candidate query rewrites includes weighting candidate rewrites based, in part, on the age of the corresponding prior query.

14. The system of claim 11, wherein generating the plurality of candidate query rewrites further comprises identifying queries from a collection of queries from a plurality of users that are similar to the search query.

15. The system of claim 11, wherein applying the plurality of scoring factors for each candidate query rewrite further comprises determining a measure of popularity for each candidate query rewrite based on a collection of queries from a plurality of users.

16. The system of claim 11, wherein applying the plurality of scoring factors for each candidate query rewrite further comprises determining whether the search query includes a referential term of a particular type.

17. The system of claim 16, wherein a score of a candidate query rewrite is increased in response to determining that the candidate query rewrite includes an entity of the particular type.

18. The system of claim 11, wherein scoring applying the plurality of scoring factors for candidate query rewrite further comprises determining whether the search query includes terms highly correlated with particular entities.

19. The system of claim 11, wherein determining a quality of each candidate query rewrite based on an analysis of search results responsive to the candidate query rewrite includes obtaining search results responsive to each candidate query rewrite and determining a quality of the search results.

20. One or more non-transitory computer-readable storage media encoded with instructions that, when executed by one or more computers, cause the one or more computers to perform operations comprising:
receiving a search query from a user during a user session;
obtaining a plurality of prior search queries by the user received during the user session;
generating a plurality of candidate query rewrites, wherein the candidate query rewrites are derived from the search query and the plurality of prior search queries by the user;
scoring each candidate query rewrite, wherein scoring each candidate rewrite includes applying a plurality of scoring factors including a quality measure for each candidate query rewrite, and wherein the quality measure is based on an analysis of search results responsive to the candidate query rewrite;
selecting a top scoring candidate query rewrite in response to determining that the score satisfies a threshold value; and
providing search results responsive to the selected candidate query rewrite.

* * * * *